Patented Nov. 26, 1935

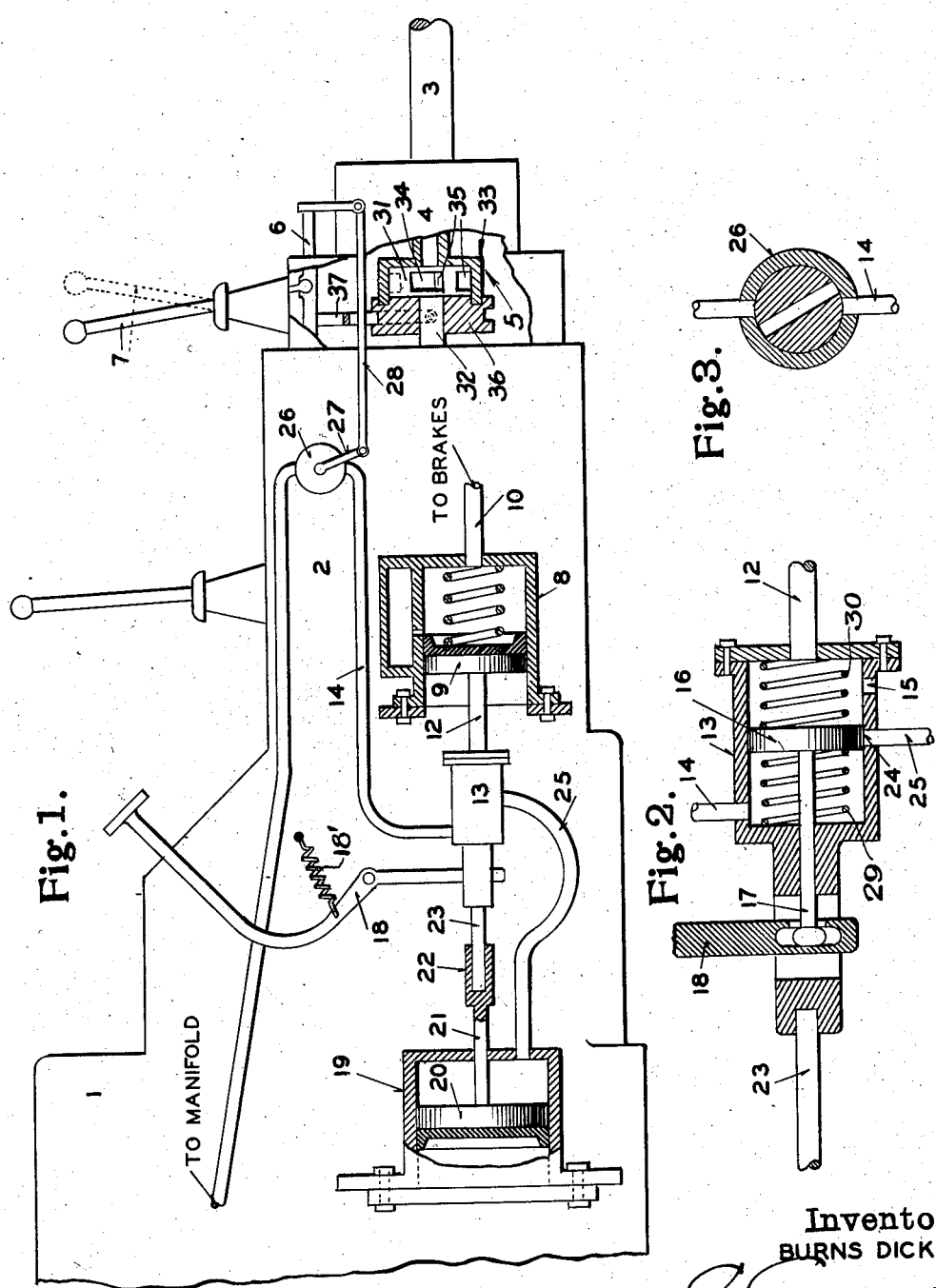

2,022,370

UNITED STATES PATENT OFFICE 2,022,370

BRAKING APPARATUS

Burns Dick, Ferguson, Mo., assignor to Wagner Electric Corporation, St. Louis, Mo., a corporation of Delaware Application October 27, 1932, Serial No. 639,765

12 Claims. (Cl. 192—13)

My invention relates to braking apparatus and more particularly to braking apparatus used upon motor vehicles which are provided with a combined overrunning (free wheel) and positive clutch between the engine and the driven wheels in addition to the usual foot controlled main friction clutch. This clutch, when in its overrunning or free-wheel position, permits power to be transmitted to the wheels but not vice versa, whereas when the clutch is in its positive position, power may be transmitted through it in both directions.

In motor vehicles which are so equipped, the braking pressure necessary to stop the vehicle is considerably greater when the clutch is in free-wheel position than when it is in positive position. The reason for this difference is that the braking effect of the engine friction is available in the positive position of the clutch, whereas it is not in the free wheel position.

The general object of my invention is to produce a braking system for use on vehicles equipped with a free-wheel clutch which will require the same manual effort to stop the vehicle, when traveling at a given speed, regardless of whether the clutch is in free-wheel or in positive position.

A more specific object is to provide power means for supplementing the braking pressure produced by the manual operation of the braking system when the clutch is in its free-wheel position, the braking effect resulting from said power means being approximately equal to the braking effect that would result from the friction of the engine if the clutch were in positive position.

Other objects of my invention will become apparent from the following description taken in connection with the accompanying drawing in which Figure 1 is a view partly in section, showing my improved braking system; Figure 2 is a cross sectional view of the control valve; and Figure 3 is a cross sectional view of the cut-off valve.

Referring to the drawing, 1 indicates the internal combustion engine of a motor vehicle, to which is connected, by means of the main friction clutch (not shown), the transmission 2 which in turn is connected to the propeller shaft 3 by means of the universal joint 4. Between the universal joint and the transmission is interposed the combined overrunning and positive clutch 5, commonly known as the "free-wheel" clutch. The clutch shown as an example comprises a cylindrical member 31 secured to the end of the transmission shaft 32 which is received in the adjacent cylindrical end 33 of the propeller shaft. The outer surface of the member 31 is provided with a plurality of tapered grooves 34 in which are carried rollers 35. The transmission shaft has secured thereto but slidable thereon, a positive clutch element 36 which is adapted to engage teeth on the cylindrical end 33 of the propeller shaft to positively connect the transmission and propeller shafts. The clutch element 36 is controlled by a shifting fork 37 secured to the slip rod 6, the slip rod being controlled by the manual lever 7. The free-wheel clutch, when in its overrunning or free-wheel position (member 36 disconnected from member 33), permits power to be transmitted from the engine to the propeller shaft but not vice versa. Under this condition of the clutch, the vehicle is permitted to freely coast when the engine is rotating the main shaft of the transmission at a lower speed than at which the wheels are driving the propeller shaft, as for example, in going down an incline with the accelerator in closed position. When the clutch is in its positive position, as shown, power may be transmitted through the clutch in both directions in the same manner as if the clutch were eliminated and the main shaft of the transmission were directly connected to the propeller shaft.

When the clutch is in its overrunning position the engine cannot be driven by the propeller shaft and, therefore, its friction is not available as a brake as is the case when the clutch is in its positive position, hence a greater brake pedal effort is necessary to stop the vehicle. This difference in brake pedal effort necessary to stop the vehicle under the different conditions of the clutch, when the vehicle is moving at a given speed, has resulted in many accidents. By means of my invention the operator is able to stop the vehicle with the same brake pedal effort regardless of what position the combined overrunning and positive clutch is in at the time of braking.

I have shown my invention applied to a hydraulically actuated brake system although it may be applied to other types. This system consists of a master cylinder 8 and a compressor piston 9 for forcing liquid under pressure through the conduits 10 to actuate the brake shoe applying motors (not shown), all of well known construction. The outer end of the piston rod 12 has attached thereto a valve casing 13, one end of which is in communication with the manifold of the engine by the conduit 14 and the other end in communication with the atmosphere by means of port 15. A valve 16 normally balanced to a central position by the springs 29 and 30 is slidable in the valve casing and is connected by means of a rod 17 with the lower end of the brake pedal 18, said brake pedal being provided with the usual return spring 18' which has little or no tension in the inoperative position of the pedal. The connection between the rod 17 and the pedal as shown being such as to prevent binding when the pedal is actuated. The portion of the valve casing which guides the rod 17, extends around the lower end of the pedal to provide a lost motion between the pedal and the valve casing in either direction of movement of the pedal from the position shown.

A cylinder 19 containing a piston 20 is positioned in alignment with the master cylinder, the piston rod 21 of the piston 20 being connected with the extension of the valve casing 13 by means of the slip joint 22 and the rod 23. The cylinder 19 is in communication with the port 24 of the valve casing by a conduit 25, the port 24 being closed by valve 16 in its normally balanced position. A cut-off valve 26 is interposed in the conduit leading from the valve casing 13 to the manifold, the operating arm 27 of the cut-off valve being connected to the clutch slip rod 6 by a rod 28 in such manner that the valve is closed when the clutch is in positive position and open when the clutch is in overrunning or free-wheel position.

In operation, when the lever 7 is in the position shown in full lines, the clutch is in positive position and the valve 26 is closed. The braking system now operates in the usual manner. When the pedal 18 is actuated, the lost motion between it and the valve casing 13, is taken up (the valve 16 being moved relative to the casing) and the compressor piston actuated to apply pressure to the brakes. The piston 20 of the vacuum motor is not moved under these conditions due to the slip joint 22.

When the lever 7 is moved to the position shown in dotted lines, the clutch is placed in overrunning position and the valve 26 is opened, thereby placing the valve casing 13 in communication with the manifold of the engine. If the brake pedal is now depressed to move the compressor piston 9, the valve 16 is moved to the right as the lost motion between the pedal and the valve casing 13 is taken up, thereby uncovering port 24 and placing the conduit 14 in communication with the cylinder 19. The suction of the engine will now produce a vacuum in the cylinder 19 causing the piston 20 to move to the right to assist the brake pedal in moving the piston 9 of the compressor. As long as the brake pedal continues to be moved, the vacuum operated piston 20 will continue to assist the pedal pressure because the port 24 will remain uncovered. When the pedal movement is discontinued, the port 24 may be closed by continued movement of the valve casing if the pressure exerted by piston 20 is sufficient to continue to move the compressor piston. The pressure applied by the vacuum-operated piston should be such that it will produce a braking effect on the vehicle which will be approximately equal to that caused by the engine friction when the clutch is in positive position. The pedal effort in applying the brakes to stop the vehicle when the clutch is in overrunning position will, therefore, be the same as when the clutch is in positive position. The pressure produced by the vacuum piston and cylinder may be varied for different vehicles by varying their dimensions.

When it is desired to release the brake, the brake pedal is released and under the action of the pedal return spring 18', the valve 16 is moved to the left, placing the cylinder 19 in communication with the atmosphere by way of port 15, releasing the pressure in the cylinder and permitting the compressor piston to be returned to its normal inoperative position. Since the pedal return spring has little or no tension in the inoperative position of the brake pedal, the valve 16 is permitted to assume its balanced position.

Having fully described my invention, what I claim as new and desire to secure by Letters Patent of the United States is:

1. In a motor vehicle provided with an optional free-wheel clutch mechanism, a braking system, and manual means for producing a braking pressure, of means operating only when the free wheel clutch mechanism is in free-wheel position for increasing the braking pressure without an increase of the manual effort.

2. In combination with the manual brake mechanism and the optional free-wheel clutch of a motor vehicle, of means for assisting the manual mechanism to apply the brakes when the clutch is in its free-wheel position.

3. In a motor vehicle provided with a combined over-running and positive clutch mechanism, a braking system and manual means for applying the brakes, the combination of power means for applying pressure to the brakes and means governed by the overrunning position for permitting said power means to be operative.

4. In a motor vehicle, the combination of an optional free-wheel clutch, a manually operated braking system, and means for supplementing the braking pressure produced by the manual operation of the braking system when the clutch is in free-wheel position.

5. In a motor vehicle, the combination of a combined overrunning and positive clutch, a brake actuating mechanism, power means for supplementing the braking pressure produced by the actuating mechanism, and means for disabling said power means when the clutch is in its positive position.

6. In a motor vehicle, the combination of a combined overrunning and positive clutch, a control therefor, manually actuated brake applying means, power means for assisting the manual actuation of the brakes, and means connected to the clutch control for permitting operation of the power means when the clutch is placed in overrunning position.

7. In a motor vehicle, the combination of a combined overrunning and positive clutch, a control therefor, manually actuated brake applying means, power means for assisting the manual actuation of the brakes, means for controlling the power means by the manual means, and means connected to the clutch control for permitting operation of the power means when the clutch is in overrunning position.

8. In a motor vehicle, the combination of a combined overrunning and positive clutch, a control therefor, manually actuated brake applying means, pneumatic power means for assisting the manual actuation of the brakes, a valve for controlling the power means, said valve being actuated by the manual means, and means governed by the clutch control in its overrunning position for permitting operation of the power means, said power means being inoperative when the clutch is in positive position.

9. In a motor vehicle, the combination with a combined overrunning and positive clutch mechanism, of a control therefor, a pedal-operated master cylinder for supplying braking pressure, an auxiliary cylinder for assisting in the actuation of the master cylinder, and means including said clutch mechanism control for governing the operation of the auxiliary cylinder.

10. In a motor vehicle, the combination with a combined overrunning and positive clutch mechanism, of a control therefor, a pedal-operated master cylinder for supplying braking pressure, an auxiliary cylinder for assisting in the actuation of the master cylinder, a fluid power supply, a connection leading from said auxiliary cylinder to said power supply, and a valve in said connection and operated from the clutch mechanism control.

11. In a motor vehicle, the combination with a combined overrunning and positive clutch mechanism, of a control therefor, a pedal-operated master cylinder for supplying braking pressure, an auxiliary cylinder for assisting in the actuation of the master cylinder, a fluid power supply, a connection leading from said auxiliary cylinder to said power supply, a valve in said connection and operated from the clutch mechanism, and a second valve in said connection, said second named valve being controlled by the movement of the pedal actuating the master cylinder.

12. In a motor vehicle, the combination with a combined overrunning and positive clutch mechanism, of a control therefor, a master cylinder for supplying braking pressure, an auxiliary cylinder coupled with said master cylinder, a fluid conduit leading from the auxiliary cylinder to the motor manifold, a valve in said conduit, a pedal operating said valve and actuating the master cylinder, and a second valve in said conduit, said second valve being governed by the clutch mechanism control.

BURNS DICK.